US008960925B2

(12) United States Patent
Huang (10) Patent No.: US 8,960,925 B2
(45) Date of Patent: Feb. 24, 2015

(54) PROJECTOR DISPLAY MODULE AND POWER SAVING METHOD THEREOF

(75) Inventor: Chih-Pen Huang, New Taipei (TW)

(73) Assignee: BenQ Corporation, Taipei (TW)

( * ) Notice: Subject to any disclaimer, the term of this patent is extended or adjusted under 35 U.S.C. 154(b) by 400 days.

(21) Appl. No.: 13/372,602

(22) Filed: Feb. 14, 2012

(65) Prior Publication Data

US 2012/0206505 A1    Aug. 16, 2012

(30) Foreign Application Priority Data

Feb. 16, 2011   (TW) .............................. 100105135 A (51) Int. Cl.
*G03B 21/14* (2006.01)
*G09G 3/00* (2006.01)
*H04N 9/31* (2006.01)
*G09G 3/34* (2006.01)

(52) U.S. Cl.
CPC ............. *G09G 3/002* (2013.01); *H04N 9/3155* (2013.01); *H04N 9/3188* (2013.01); *G09G 3/3406* (2013.01); *G09G 2320/0626* (2013.01); *G09G 2320/103* (2013.01); *G09G 2330/021* (2013.01); *G09G 2360/16* (2013.01)
USPC ............................................. 353/85; 353/121

(58) Field of Classification Search
USPC ....................... 353/85; 345/212, 102; 713/320
See application file for complete search history.

(56) References Cited

U.S. PATENT DOCUMENTS

| 7,247,996 | B2 | 7/2007 | Morishita |
| 7,796,140 | B2 | 9/2010 | Fujimori |
| 7,815,317 | B2 * | 10/2010 | Miyasaka ........................ 353/85 |
| 8,061,856 | B2 * | 11/2011 | Shirai et al. ..................... 353/99 |
| 2001/0005193 | A1 * | 6/2001 | Yokoyama ....................... 345/92 |
| 2003/0030618 | A1 * | 2/2003 | Jones ............................ 345/102 |
| 2006/0062305 | A1 | 3/2006 | Lu et al. |
| 2008/0225241 | A1 | 9/2008 | Chen et al. |
| 2009/0115767 | A1 * | 5/2009 | Chang et al. .................. 345/212 |
| 2010/0117539 | A1 | 5/2010 | Kotani et al. |
| 2010/0302397 | A1 | 12/2010 | Huang et al. |

FOREIGN PATENT DOCUMENTS

| EP | 2019480 A2 | 1/2009 |
| TW | 093128347 | 4/2006 |
| TW | 096109221 | 10/2008 |
| TW | 096141563 | 5/2009 |
| TW | 098117849 | 12/2010 |

OTHER PUBLICATIONS

Office action of counterpart application by Taiwan IP Office on Jan. 16, 2014.

* cited by examiner

*Primary Examiner* — William C Dowling (57) ABSTRACT

A projector display module and its power saving method are provided. The projector display module includes a signal source, an analog-to-digital converter, a display control unit, a ballast, and a light source. The display control unit retrieves signal from the signal source and outputs a control signal to the ballast to adjust the power of light source. The display control unit includes a comparison module and a control signal generation module. The power saving method includes the following steps: retrieving the first pixel data of a preset position of the first frame and the second pixel data of the preset position of the second frame from the signal source. The display control unit compares the first pixel data and the second data to produce a comparison result. According to the comparison result, the display control unit produces a control signal to adjust the power of light source.

15 Claims, 9 Drawing Sheets

PROJECTOR DISPLAY MODULE AND POWER SAVING METHOD THEREOF

BACKGROUND OF THE INVENTION

1. Field of the Invention

The present invention relates to a light source control system and a power saving method thereof; in particular, the present invention relates to a projector display module capable of automatically switching to power saving mode and a projector power saving method thereof.

2. Description of the Prior Art

Because projectors are high power-consumption products, when the user temporarily leaves or the projector is in idle state, the projector display module of the projector will not automatically switch to a power saving mode and the user has to manually turn the power off or switch the projector to the power saving mode. If the user forgets to take such actions, the power will be wasted and the life of the light source will be reduced.

Traditionally, methods of adjusting the light source of the projector are classified into two types: (1) when the display device is switched to the power saving mode by the user, a power transformer outputs a low voltage signal; when the display device is operated in normal mode, the power transformer outputs a high voltage signal, so that the power consumption can be reduced by switching the voltage; (2) after the projector receives a turn-off command, the rotating speed of the fan is elevated and the light source does not turn off until the temperature of the light source drops to a reference temperature.

However, the methods mentioned above can not provide a direct and real-time method to serve the power saving purpose. Besides, to achieve the power saving purpose, the traditional methods depend on manually operating the On-Screen Display System (OSD); when the power saving mode is not required, the projector is again manually switched back to the normal mode. Such a manual switch operation is highly inconvenient.

SUMMARY OF THE INVENTION

One object of the present invention is to provide a projector display module and a power saving method thereof that can automatically detect pixel data in different frames.

Another object of the present invention is to provide a projector display module and a power saving method thereof that can show the effect of saving power and extend the life of the light source.

The projector display module includes a signal source, an analog-to-digital converter, a display control unit, a ballast, and a light source. The display control unit retrieves signal from the signal source and outputs a control signal to the ballast to adjust the power of the light source. The display control unit includes a scaling module, a comparison module, a control signal generation module, and a frame shielding module.

The power saving method includes the following steps: retrieving a first pixel data of a preset position of the first frame and a second pixel data of the preset position of the second frame from the signal source. The display control unit compares the first pixel data and the second data to produce a comparison result. According to the comparison result, the display control unit produces a control signal to adjust the power of the light source.

DETAILED DESCRIPTION OF THE PREFERRED EMBODIMENT

Figure 1:
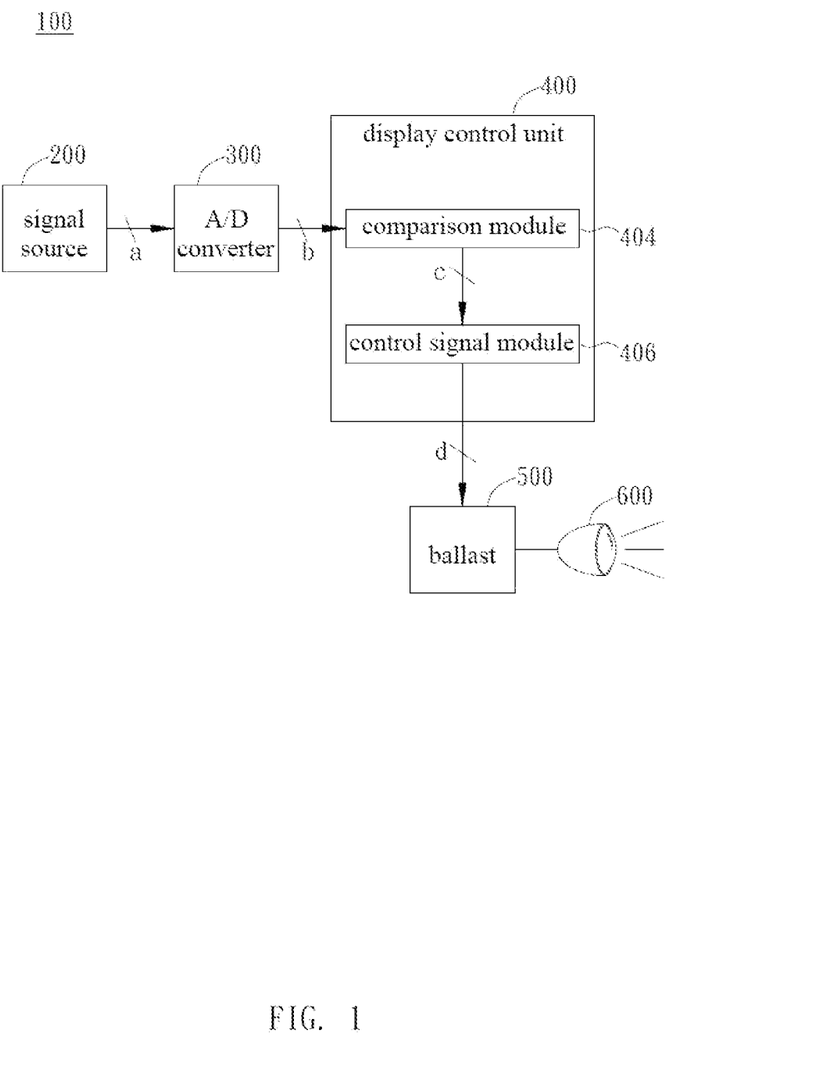
FIG. 1 is a schematic view of an embodiment of a projector display module.

The present invention is to provide a projector display module and a power saving method thereof. As shown in FIG. 1, the projector display module 100 includes a signal source 200, a display control unit 400, a ballast 500, and a light source 600. The signal source 200 may be generated from Video Graphics Array (VGA), High Definition Television (HDTV), Video or other interfaces. In this embodiment, the projector display module 100 further includes an analog-to-digital converter 300 to convert an analog signal "a" into a digital signal and output the digital signal "b". In other embodiments, the analog-to-digital converter 300 can be integrated with the display control unit 400. Besides, the analog-to-digital converter 300 may be substituted with other signal receivers utilized to receive signals generated from High Definition Multimedia Interface (HDMI) or Digital Visual Interface (DVI).

The display control unit 400 is configured to retrieve signals generated from the signal source 200 and preferably includes a comparison module 404 and a control signal generation module 406. The comparison module 404 compares input image signals "a" received at different time to produce a comparison result "c". Then, the control signal generation module 406 generates a control signal "d" and outputs the control signal "d" to the ballast 500. Then, the light source 600 is adjusted by the ballast 500. Specifically, when the comparison result "c" shows no difference in pixel data of the frames, the display control unit 400 outputs the control signal "d" to the ballast 500 to darken the light source 600. When the comparison result "c" shows that there is a difference in pixel data of the frames, the display control unit 400 outputs the control signal "d" to the ballast 500 to maintain the luminance of the light source 600.

Figure 2:
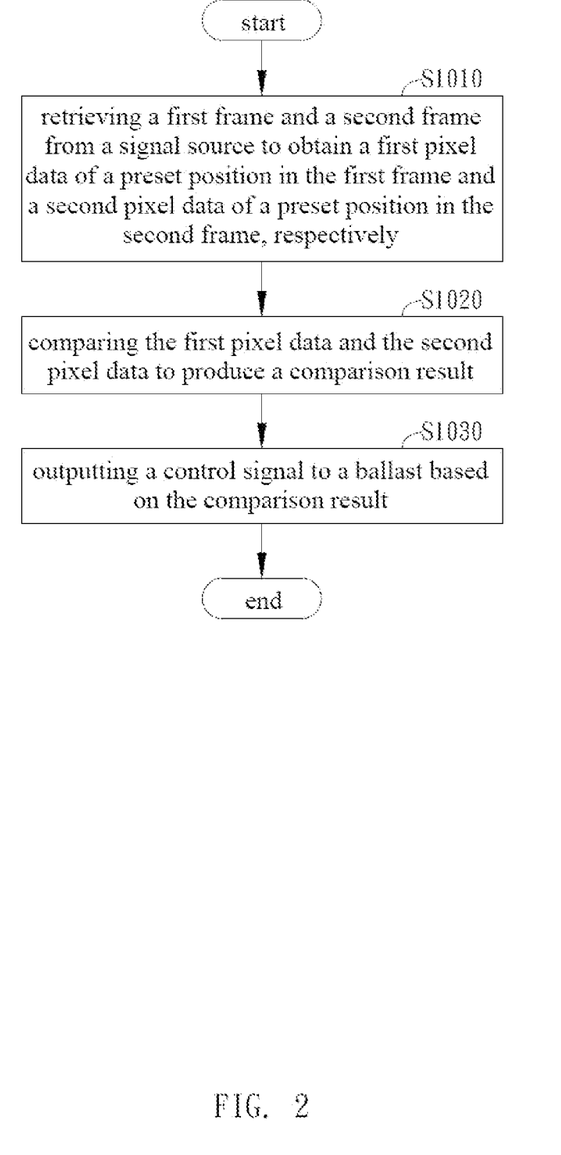
FIG. 2 is a flowchart of an embodiment of a projector power saving method.

FIG. 2 is a flowchart of an embodiment of a projector power saving method. As shown in FIGS. 1 and 2, the step S1010 includes retrieving a first frame 210 from the signal source 200 to obtain a first pixel data 212 of a preset position in the first frame 210 and retrieving a second frame 220 from the signal source 200 to obtain a second pixel data 222 of the preset position in the second frame 220.

Figure 3A:
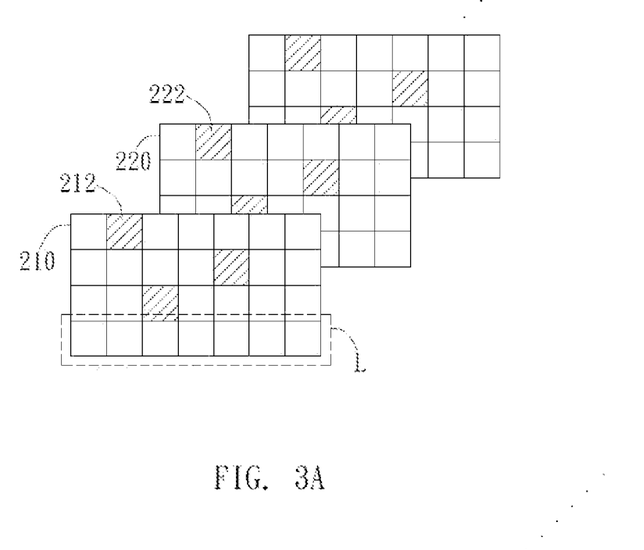
FIG. 3A is a schematic view of an embodiment of comparing pixel data in different frames.

Please also refer to the schematic view of an embodiment of comparing pixel data in different frames of FIG. 3A. The first frame 210 means a former input image signal and the second frame 220 means a latter input image signal with respect to time. That is, the second frame 220 is input after the first frame 210. The first frame 210 has multiple scan lines L, wherein each scan line L includes a plurality of pixel data; each pixel data preferably consists of color space data of red, green, and blue each in eight bits, i.e. the 24 bit RGB color space can describe 8 bits for each RGB. That is, the 24-bit encoded RGB value for each pixel can represent RGB color model in different ratio. As shown in FIG. 3A, the first frame 210 and the second frame 220 are divided into multiple blocks in the same way. The display control unit 400 retrieves the first pixel data 212 of a preset position in the first frame 210 and the second pixel data 222 of the preset position in the second frame 220.

Figure 3B:
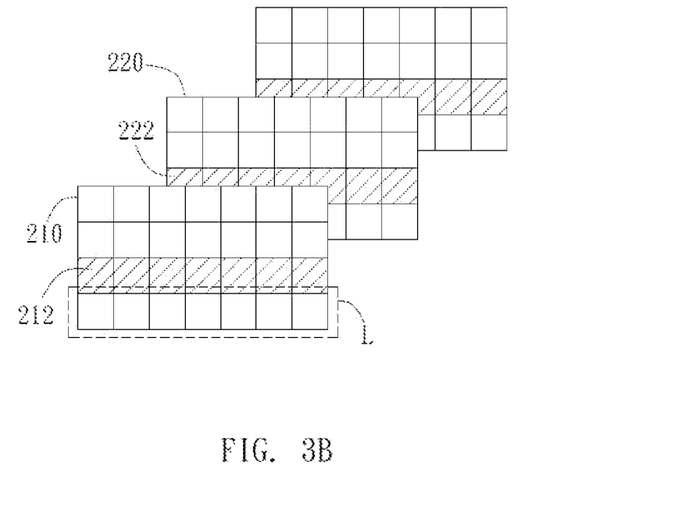
FIG. 3B is a schematic view of another embodiment of comparing pixel data in different frames.

The preset position mentioned above may be certain single pixels or a row of pixels, as shown in FIGS. 3A and 3B. In other embodiments, the comparison module 404 of the display control unit 400 may compare all pixel data in the first frame 210 and the second frame 220 pixel by pixel. That is, the preset position may include the entire range of the first frame 210 and the second frame 220. The display control unit 400 retrieves pixel data of each scan line "L" and sequentially compares the first pixel data 212 and the second pixel data 222. Besides, the comparing method may be performed by the display control unit 400 to acquire a mean value of all pixel data included in a specific area or the entire range of the first frame 210 and a mean value of all pixel data included in a specific area or the entire range of the second frame 220 to serve as the first pixel data 212 and the second pixel data 222. Then, the first pixel data 212 and the second pixel data 222 are compared.

The step S1020 includes comparing the first pixel data and the second pixel data to produce a comparison result. As shown in FIG. 3A, the display control unit retrieves the first pixel data 212 of preset positions of the first frame 210 and the second pixel data 222 of the preset positions of the second frame 220, and the comparison module 404 is activated to continuously compare the former pixel data and the later pixel data. Step S1030 includes generating a control signal based on the comparison result. When the pixel data of the preset positions in the frames are maintained the same during a preset time period, the control signal generation module 406 generates a control signal "d" based on the comparison result "c" received from the comparison module 404 and outputs the control signal "d" to the ballast 500 to decrease the luminance of the light source 600 and achieve the goal of power-saving. When the pixel data of the preset positions in the frames are different during the preset time period, the control signal generation module 406 generates a control signal "d" based on the comparison result "c" received from the comparison module 404 and outputs the control signal "d" to the ballast 500 to maintain the luminance of the light source 600 by the ballast 500.

The comparison is preferably continuously performed after the projector display module 100 is powered on. If the first pixel data 212 of the first frame 210 and the second pixel data 222 of the second frame 220 show no difference, the comparison module 404 outputs the comparison result "c" to the control signal generation module 406. Then, the control signal generation module 406 outputs the control signal "d" to the ballast 500 to adjust the luminance of the light source 600. If the first pixel data 212 of the first frame 210 and the second pixel data 222 of the second frame 220 are different, the comparison module 404 continuously retrieves and compares the pixel data. For example, the length of the preset time period can be thirty seconds, sixty seconds, three minutes, and any suitable interval. In other embodiments, to automatically switch the projector display module 100 to the power saving mode, the comparison module 404 of the display control unit 400 can be activated upon the frame pauses so that the projector display module 100 can automatically enter the power-saving mode.

Figure 4A:
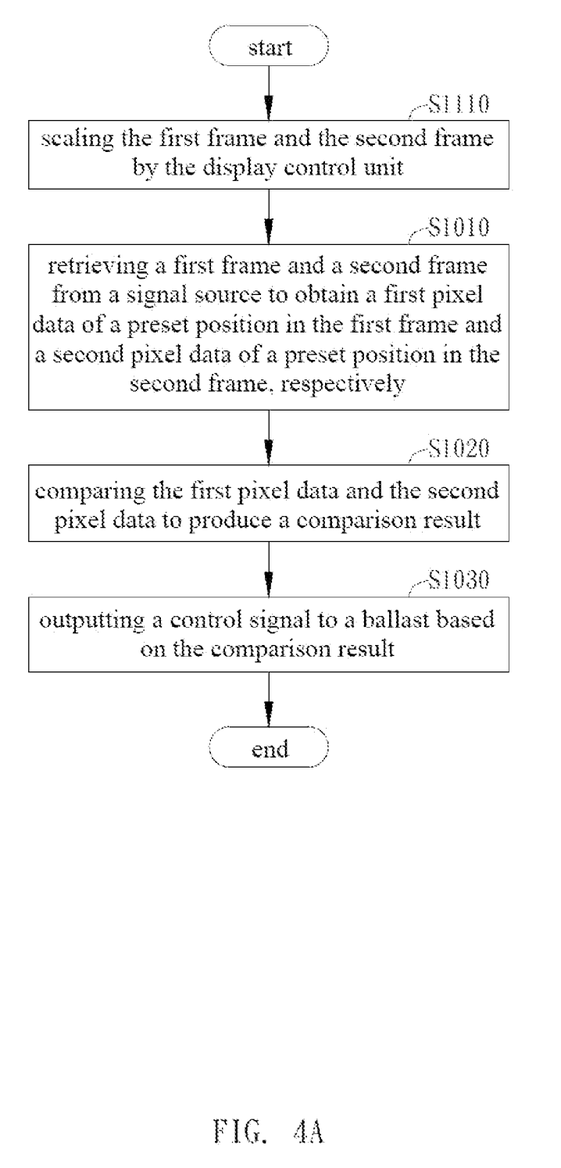
FIG. 4A is a flowchart of another embodiment of the projector power saving method.
Figure 4B:
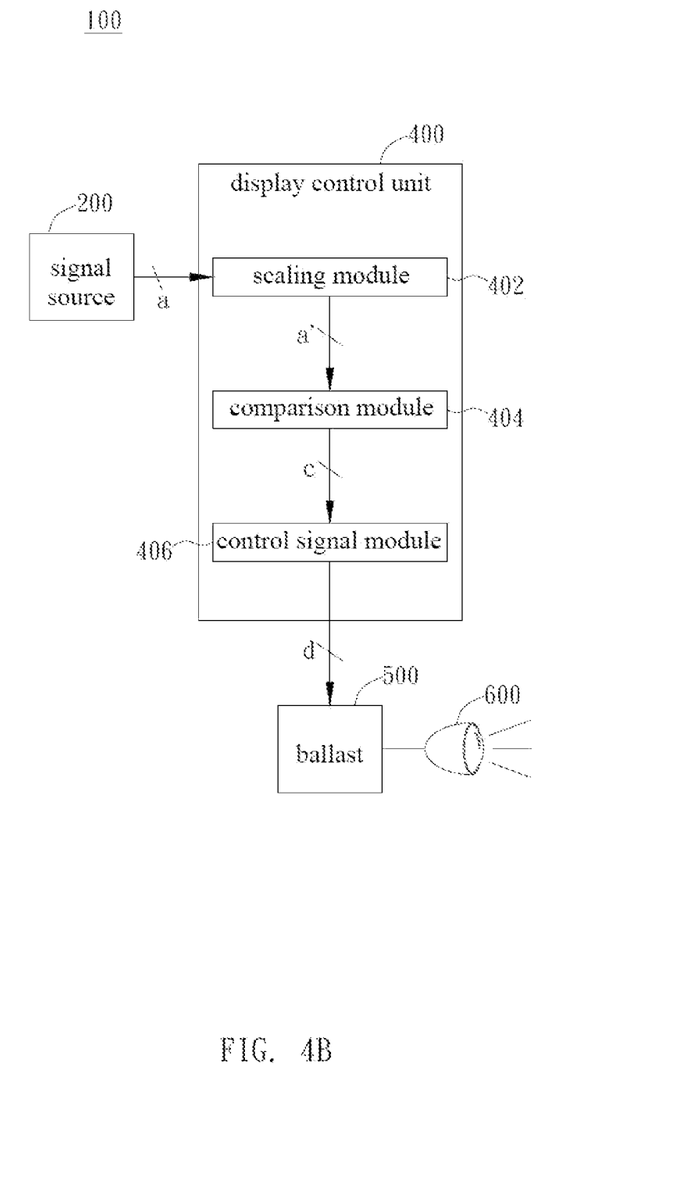
FIG. 4B is a schematic view of another embodiment of the projector display module.

In another embodiment of FIG. 4A, the method further includes the step S1110: scaling the first frame and the second frame by the display control unit. When the resolution of the input image signal "a" is different from the resolution of an output image signal, the display control unit 400 will enlarge or shrink the frame by combining or inserting points. Also referring to FIG. 4B, after the display control unit 400 retrieves frames from the signal source 200, a scaling module 402 is activated to adjust the size of the frame, and then the scaling module 402 outputs the adjusted frame signal "a'" to the comparison module 404. The comparison module 404 retrieves the first pixel data 212 of the adjusted first frame 210 and the second pixel data 222 of the adjusted second frame 220. Thus, the comparison module 404 continuously compares the pixel data of the former frame and the later frame that are adjusted. When the pixel data of the preset position of the frames show no difference during a preset time period, the control signal generation module 406 outputs the control signal "d" to the ballast 500 based on the comparison result "c" received from the comparison module 404 to decrease the luminance of the light source 600 and save power. When the pixel data of the preset position of the frames are different during the preset time period, the control signal generation module 406 outputs the control signal "d" to the ballast 500 so that the ballast 500 can maintain the luminance of the light source 600.

Figure 5A:
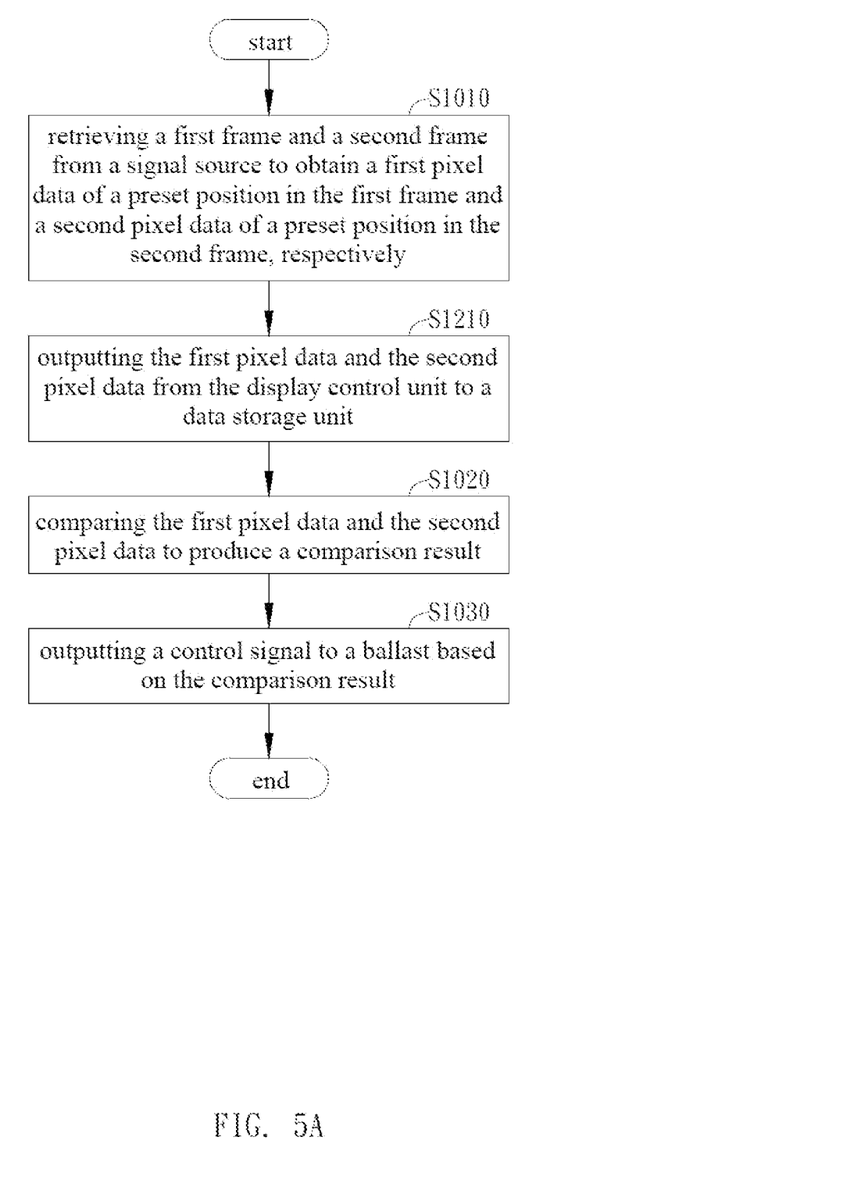
FIG. 5A is a flowchart of another embodiment of the projector power saving method.
Figure 5B:
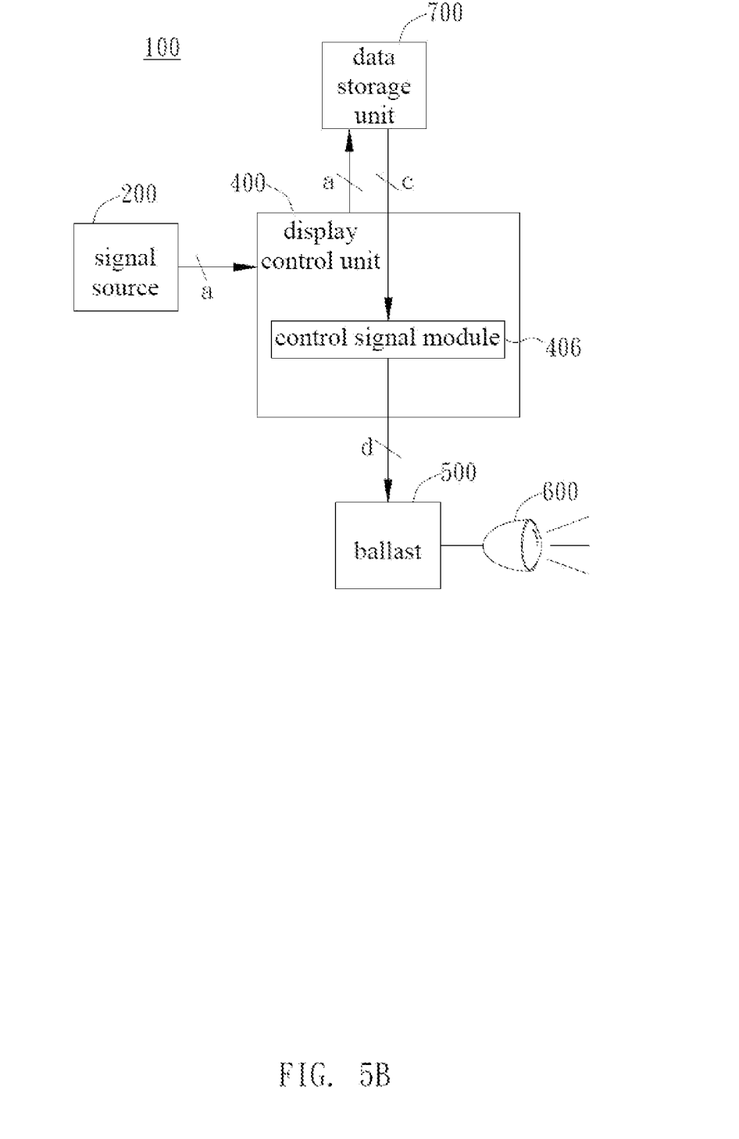
FIG. 5B is a schematic view of another embodiment of the projector display module.

In the embodiment of FIG. 5A, the method further includes the step S1210: outputting the first pixel data and the second pixel data from the display control unit to a data storage unit. As shown in the embodiment of FIG. 5B, after retrieving the signal source 200, the display control unit 400 stores the first pixel data 212 of the first frame 210 and the second pixel data 222 of the second frame 220 to a data storage unit 700 disposed external to the display control unit 400. The first pixel data 212 and the second pixel data 222 are compared in the data storage unit 700, then the comparison result "c" is sent back to the display control unit 400, so that the display control unit 400 can activate the control signal generation module 406. After that, the control signal generation module 406 outputs the control signal "d" to the ballast 500 based on the difference between the first pixel data 212 and the second pixel data 222, and the ballast 500 adjusts the luminance of the light source 600. In other embodiments, the data storage unit 700 may store a table. After retrieving the first pixel data 212 and the second pixel data 222, the display control unit 400 outputs the pixel data to the data storage unit 700, and referencing the physical quantities in the table, the data storage unit 700 matches the pixel data with the content in the table to achieve the effect of adjusting the light source 600 dynamically. For example, a Gamma Curve table (GC table) is stored in the data storage unit 700 to serve as the table mentioned above. After the display control unit 400 retrieves the first pixel data 212 of the first frame 210 and the second pixel data 222 of the second frame 220, the luminance values corresponding to the first pixel data 212 and the second pixel data 222 are obtained from the GC table respectively. The data storage unit 700 calculates the mean value of the luminance values of the first pixel data and that of the second pixel data and then compares the mean values for adjusting the luminance of the light source 600.

Figure 6A:
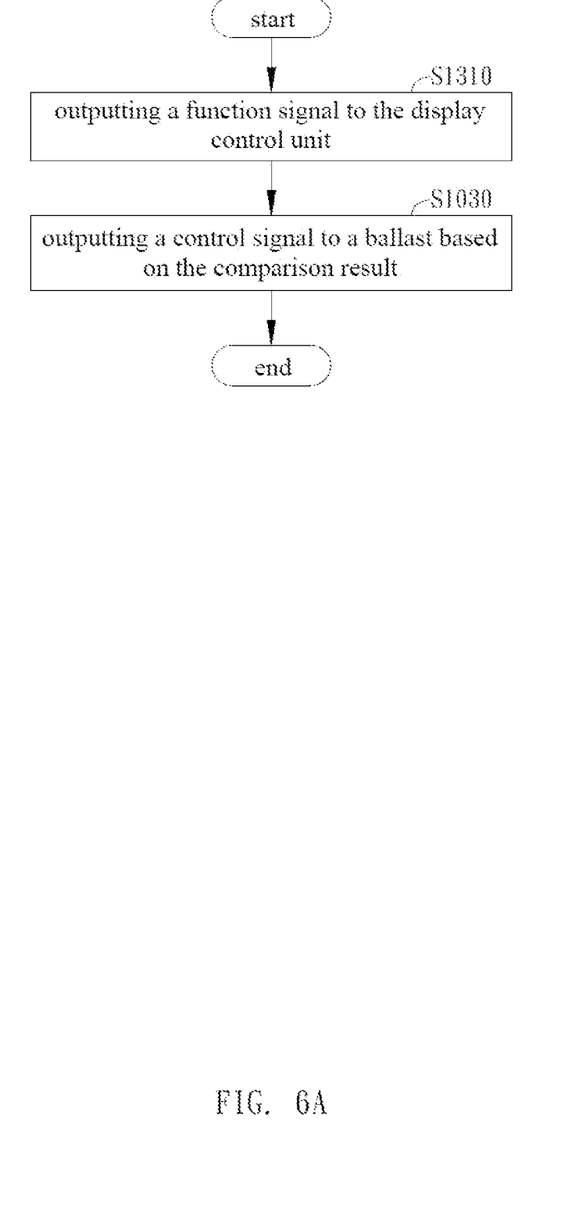
FIG. 6A is a flowchart of another embodiment of the projector power saving method.
Figure 6B:
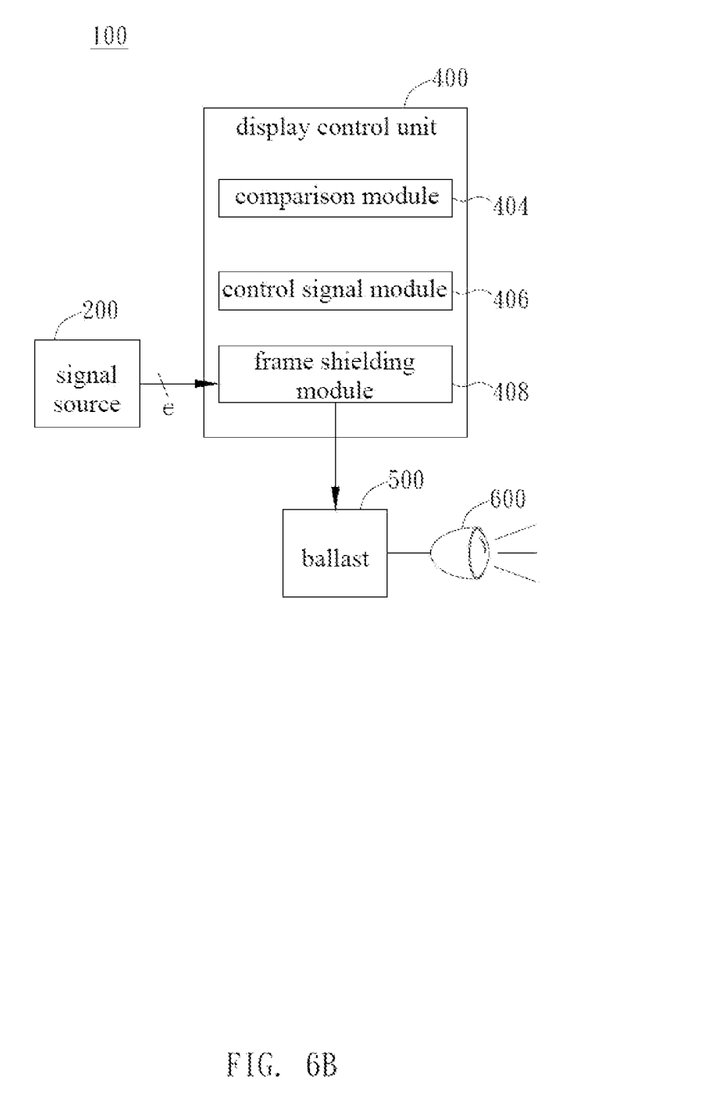
FIG. 6B is a schematic view of another embodiment of the projector display module.

In the flowchart of FIG. 6A, the method further includes the step S1310: outputting a function signal to the display control unit. As shown in FIG. 6B, the user selects a function that is inputted through the signal source 200 to the display control unit 400. The display control unit 400 activates the frame shielding module 408 based on the function and outputs a function signal "e" to the ballast 500 to decrease the luminance of the light source 600. By this function, the function signal can be directly inputted to the frame shielding module 408 of the display control unit 400 and simplify the manual operation.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A projector power saving method, comprising:
   retrieving a first frame from a signal source;
   dividing the first frame into a plurality of blocks;
   separately retrieving pixel data from a specific position of each block as a first pixel data of a preset position in the first frame;
   retrieving a second frame from the signal source to obtain a second pixel data of the preset position in the second frame;
   comparing the first pixel data and the second pixel data by a display control unit to produce a comparison result; and
   outputting a control signal to a ballast based on the comparison result so that the ballast adjusts an output power to control the luminance of a light source.

2. The projector power saving method of claim 1, wherein the step of comparing the pixel data comprises:
   outputting the first pixel data and the second pixel data from the display control unit to a data storage unit; and
   comparing the pixel data in the data storage unit.

3. The projector power saving method of claim 1, wherein the step of outputting the control signal comprises:
   when the comparison result shows no difference in the pixel data, the display control unit outputs the control signal to the ballast to darken the light source.

4. The projector power saving method of claim 1, wherein the step of outputting the control signal comprises:
   when the comparison result shows difference in the pixel data, the display control unit outputs the control signal to the ballast to maintain the luminance of the light source.

5. The projector power saving method of claim 1, wherein the first pixel data and the second pixel data respectively comprise pixel data of color space of the first frame and of the second frame.

6. The projector power saving method of claim 1, wherein the display control unit further comprises a frame shielding module capable of directly outputting a function signal to decrease the luminance of the light source to make a frame become darker.

7. A projector display module, comprising:
   a signal source outputting a first frame and a second frame, wherein the first frame comprises a first pixel data and the second frame comprises a second pixel data;
   a display control unit obtaining the first pixel data and the second pixel data of a preset position in the first frame and the second frame, the display control unit comprising:
      a comparison module comparing the first pixel data and the second pixel data to output a comparison result;
      a control signal generation module producing a control signal based on the comparison result; and
      a scaling module for scaling the first frame and the second frame
   a ballast receiving the control signal from the display control unit; and
   a light source connected to the ballast, wherein the ballast adjusts the luminance of the light source based on the control signal.

8. The projector display module of claim 7, further comprising a data storage unit, connected to the display control unit, for storing the first pixel data and the second pixel data.

9. The projector display module of claim 7, wherein the comparison module sequentially compares pixel data of the first frame and the second frame pixel by pixel.

10. The projector display module of claim 7, wherein when the comparison result shows no difference in the pixel data, the display control unit outputs the control signal to the ballast to darken the light source.

11. The projector display module of claim 7, wherein when the comparison result shows difference in the pixel data, the display control unit outputs the control signal to the ballast to maintain the luminance of the light source.

12. A projector power saving method, comprising:
   retrieving a first frame from a signal source;
   retrieving a plurality of pixel data of the first frame;
   acquiring a mean value of the pixel data of the plurality of pixel data as a first pixel data of a preset position in the first frame;
   retrieving a second frame from the signal source to obtain a second pixel data of the preset position in the second frame;
   comparing the first pixel data and the second pixel data by a display control unit to produce a comparison result; and
   outputting a control signal to a ballast based on the comparison result so that the ballast adjusts an output power to control the luminance of a light source.

13. A projector power saving method, comprising:
   retrieving a first frame from a signal source to obtain a first pixel data;
   retrieving a second frame from the signal source to obtain a second pixel data;
   sequentially comparing all pixel data in the first frame and the second frame pixel by pixel by a display control unit to produce a comparison result; and
   outputting a control signal to a ballast based on the comparison result so that the ballast adjusts an output power to control the luminance of a light source.

14. A projector power saving method, comprising:
   retrieving a first frame from a signal source to obtain a first pixel data of a preset position in the first frame;
   retrieving a second frame from the signal source to obtain a second pixel data of the preset position in the second frame;
   outputting the first pixel data and the second pixel data from a display control unit to a data storage unit;
   referencing a table in the data storage unit to obtain a luminance value corresponding to the first pixel data and a luminance value corresponding to the second pixel data;
   averaging the luminance values to respectively obtain the first pixel data and the second pixel data in the data storage unit;
   comparing the first pixel data and the second pixel data in the data storage unit; and
   outputting a control signal to a ballast based on the comparison result so that the ballast adjusts an output power to control the luminance of a light source.

15. A projector power saving method, comprising:
retrieving a first frame from a signal source;
scaling the first frame by a display control unit to obtain a first pixel data of a preset position in the first frame;
retrieving a second frame from the signal source;
scaling the second frame by the display control unit to obtain a second pixel data of the preset position in the second frame;
comparing the first pixel data and the second pixel data by the display control unit to produce a comparison result; and
outputting a control signal to a ballast based on the comparison result so that the ballast adjusts an output power to control the luminance of a light source.

* * * * *